(No Model.)

G. W. MILLS & J. MORPHETT.
COMBINED CRAYON SHARPENER, CUSHION, AND WEIGHT.

No. 412,401. Patented Oct. 8, 1889.

WITNESSES:
C W Benjamin
Richard N. Buel.

INVENTORS
George W Mills
James Morphett
BY Joseph L. Levy
their ATTORNEY

UNITED STATES PATENT OFFICE.

GEORGE W. MILLS, OF ELIZABETH, NEW JERSEY, AND JAMES MORPHETT, OF BROOKLYN, NEW YORK.

COMBINED CRAYON-SHARPENER, CUSHION, AND WEIGHT.

SPECIFICATION forming part of Letters Patent No. 412,401, dated October 8, 1889.

Application filed August 17, 1888. Serial No. 282,996. (No model.)

*To all whom it may concern:*

Be it known that we, GEORGE W. MILLS, residing at Elizabeth, in the county of Union and State of New Jersey, and JAMES MORPHETT, residing at Brooklyn, in the county of Kings and State of New York, both citizens of the United States, have invented a new and useful Combined Crayon-Sharpener, Cushion, and Weight, of which the following is a specification.

Our invention relates to a new and useful combined device, formed of metal or other heavy material or wood weighted, for the use of tailors, cutters, and analogous trades; and it consists of a crayon-sharpener that will pare or cut the working-edge of the crayon into an oblique angle or other shape desired, the sharpened edge being made straight by means of a guide properly located, a cushion so located upon the device that it will present itself for use always in a handy location, and a weight for retaining the goods to be worked upon in their proper position, or for any other purpose to which it might be applied, which weight is obtained by so forming the body of the device that the greatest weight will be obtained in those parts not put into active use. We also form upon this device a holder for the crayon when it is not in use, and also provide it with an interior recess closed in any suitable manner, wherein the dust or chips resulting from the paring or cutting away of the crayon will lodge, and which may be removed at leisure, thus preventing the crayon-dust from getting upon the material near it and soiling it. We attain these results by means of the device illustrated in the accompanying drawings, forming part of this specification, in which the same letters of reference represent corresponding parts throughout the several views.

Figure 1:
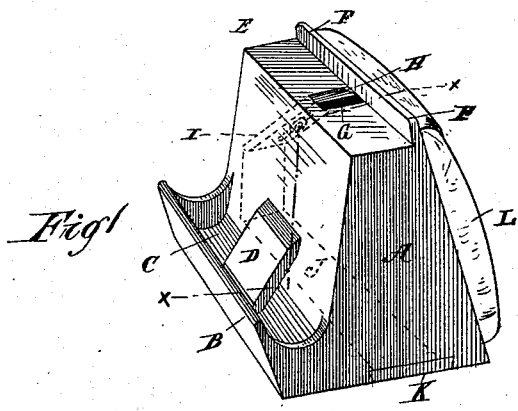
Figure 2:
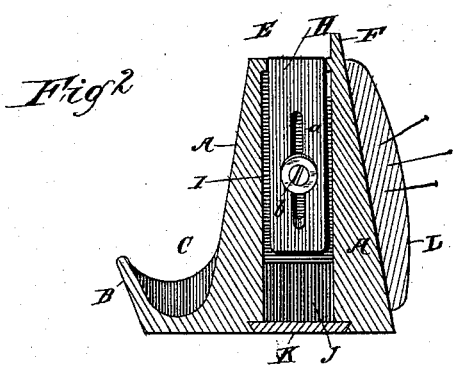

Figure 1 is a perspective view of our device; and Fig. 2, a cross-section of the same, taken on the line $x\ x$, Fig. 1.

In the drawings, A is the body of our device, which is constructed in this instance in pyramidal form, having a front extension B, provided with a circular or otherwise shaped recess C, which forms a receptacle for the crayon D when it is not in use.

The top E of the device is made flat, so as to offer a good bearing-surface for the crayon while being cut, and along the rear edge, and rising to any suitable distance above it, is a guide F, against which the end of the crayon to be sharpened abuts, and by which a straight, clean edge may be obtained.

The flat top section E is provided with an opening G, through which the cutting-edge of the plane or knife protrudes to a sufficient extent to properly cut the crayon, and this plane is adjustably secured within the device in an inclined position to the inclined interior section I, specially provided for it at one side of the device, and which extends inwardly and upwardly through the interior chamber J.

The plane H can be made in any shape or form, and can also be made adjustable in any usual way. In the example shown it is provided with a slot $a$ and set-screw and washer $b$, by which it is adjusted.

The interior chamber J is formed in the device for the purpose of providing a suitable place to locate the plane H, and also as a receptacle for the parings or shavings from the crayon, into which they will fall and be held therein until it is desired to remove them, and prevent the same from falling onto the cloth or other material lying near. The chamber J is closed by means of the sliding door K, which may be opened to empty the same. An opening may be made in the chamber and closed in any desired manner, as we do not limit ourselves to any particular construction of this part of our device.

On the rear inclined portion of our device we locate a cushion made of any desired material, and by its being located in the inclined position shown it presents its surface for use in a more convenient manner than if it were placed vertically.

The particular form and position of the parts of our device may be altered to suit particular occasions without departing from the essence of our invention.

Having thus described our invention, what we claim, and desire to secure by Letters Patent, is—

1. In a combined crayon-sharpener, pincushion, weight, and crayon-holder, the combination of a flat top E with a knife H and the guide F, substantially as described.

2. In a combined crayon-sharpener, pincushion, weight, and crayon-holder, the combination of a flat top E with the knife H, guide F, and receptacle J, substantially as described.

Signed at the city, county, and State of New York this 16th day of August, 1888.

GEORGE W. MILLS.
JAMES MORPHETT.

Witnesses:
GEO. W. WEIFFENBACH,
JOSEPH L. LEVY.